US012668185B2

(12) United States Patent
Minikey, Jr. et al.

(10) Patent No.: US 12,668,185 B2
(45) Date of Patent: Jun. 30, 2026

(54) FULL DISPLAY MIRROR ASSEMBLY WITH THROUGH BEZEL INFRARED ILLUMINATION

(71) Applicant: Gentex Corporation, Zeeland, MI (US)

(72) Inventors: Danny L. Minikey, Jr., Fenwick, MI (US); Steven J. Veenman, Hudsonville, MI (US); Eric S. Sloterbeek, Hudsonville, MI (US); Nigel T. Lock, Holland, MI (US); Michael G. Hendricks, Wyoming, MI (US); Eric S. Lundy, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 482 days.

(21) Appl. No.: 18/124,289

(22) Filed: Mar. 21, 2023

(65) Prior Publication Data

US 2023/0302996 A1 Sep. 28, 2023

Related U.S. Application Data

(60) Provisional application No. 63/322,394, filed on Mar. 22, 2022.

(51) Int. Cl.
B60R 1/12 (2006.01)
B60K 35/10 (2024.01)
(Continued)

(52) U.S. Cl.
CPC ................ B60R 1/08 (2013.01); B60K 35/10 (2024.01); B60K 35/22 (2024.01); B60K 35/60 (2024.01);
(Continued)

(58) Field of Classification Search
CPC ..... B60R 1/08; B60R 1/12; B60R 2001/1223; B60R 2001/1253; B60Q 3/258;
(Continued)

(56) References Cited

U.S. PATENT DOCUMENTS 5,928,572 A 7/1999 Tonar et al.
5,998,617 A 12/1999 Srinivasa et al.
(Continued)

FOREIGN PATENT DOCUMENTS

WO 9842796 A1 10/1998
WO 9902621 A1 1/1999

OTHER PUBLICATIONS

U.S. Appl. No. 61/704,869, filed Sep. 24, 2012, entitled Image Manipulation for Automotive Rearview Device.
(Continued)

*Primary Examiner* — Balram T Parbadia
(74) *Attorney, Agent, or Firm* — Price Heneveld LLP; Brian James Brewer

(57) ABSTRACT

A full display mirror assembly for a vehicle includes a housing and a partially reflective, partially transmissive element is located in the housing. A bezel assembly includes at least one localized region that is substantially opaque to a visible spectrum of light and substantially transmissive to an infrared spectrum of light. At least one illumination element is located in the housing and oriented to project infrared illumination through the at least one localized region.

17 Claims, 8 Drawing Sheets

A-A

(51) Int. Cl.

| | |
|---|---|
| *B60K 35/22* | (2024.01) |
| *B60K 35/60* | (2024.01) |
| *B60K 35/81* | (2024.01) |
| *B60Q 3/258* | (2017.01) |
| *B60R 1/08* | (2006.01) |
| *B60K 35/28* | (2024.01) |
| *B60K 35/40* | (2024.01) |
| *B60K 35/50* | (2024.01) |

(52) U.S. Cl.
CPC .............. *B60K 35/81* (2024.01); *B60Q 3/258* (2017.02); *B60R 1/12* (2013.01); *B60K 35/28* (2024.01); *B60K 35/415* (2024.01); *B60K 35/50* (2024.01); *B60R 2001/1223* (2013.01); *B60R 2001/1253* (2013.01)

(58) Field of Classification Search
CPC ........ B60K 35/22; B60K 35/81; B60K 35/28; B60K 35/415; B60K 35/60; B60K 35/50; B60K 2360/1438; B60K 2360/23; B60K 2360/25; B60K 2360/27; B60K 2360/33; B60K 35/10; B60W 2420/40
See application file for complete search history.

(56) References Cited

U.S. PATENT DOCUMENTS

| | | | |
|---|---|---|---|
| 6,020,987 | A | 2/2000 | Baumann et al. |
| 6,037,471 | A | 3/2000 | Srinivasa et al. |
| 6,137,620 | A | 10/2000 | Guarr et al. |
| 6,141,137 | A | 10/2000 | Byker et al. |
| 6,193,912 | B1 | 2/2001 | Thieste et al. |
| 6,249,369 | B1 | 6/2001 | Theiste et al. |
| 6,519,072 | B2 | 2/2003 | Nishikitani et al. |
| 6,614,579 | B2 | 9/2003 | Roberts et al. |
| 8,201,800 | B2 | 6/2012 | Filipiak |
| 8,210,695 | B2 | 7/2012 | Roth et al. |
| 8,264,761 | B2 | 9/2012 | Cammenga et al. |
| 8,643,931 | B2 | 2/2014 | Cammenga et al. |
| 8,646,924 | B2 | 2/2014 | Roth et al. |
| 8,814,373 | B2 | 8/2014 | Steel et al. |
| 8,827,517 | B2 | 9/2014 | Cammenga et al. |
| 8,885,240 | B2 | 11/2014 | Roth et al. |
| 8,925,891 | B2 | 1/2015 | Van Huis et al. |
| 8,960,629 | B2 | 2/2015 | Rizk et al. |
| 9,174,577 | B2 | 11/2015 | Busscher et al. |
| 9,244,249 | B2 | 1/2016 | Kim et al. |
| 9,316,347 | B2 | 4/2016 | Roth |
| 9,505,349 | B2 | 11/2016 | Fish, Jr. et al. |
| 9,838,653 | B2 | 12/2017 | Fish, Jr. et al. |
| 10,739,591 | B2 | 8/2020 | Lee et al. |
| 2001/0022550 | A1* | 9/2001 | Steffel ................... B60R 25/305 340/541 |
| 2006/0164230 | A1* | 7/2006 | DeWind ................. B60K 35/00 340/461 |
| 2007/0046443 | A1* | 3/2007 | Zhang ................. B60R 25/1004 340/426.24 |
| 2007/0114810 | A1* | 5/2007 | Yetukuri .............. B60N 2/0226 296/65.01 |
| 2008/0218769 | A1* | 9/2008 | Ahn ......................... G06F 3/042 356/614 |
| 2009/0067141 | A1* | 3/2009 | Dabov ................. H05K 9/0026 361/753 |
| 2012/0249480 | A1* | 10/2012 | Keenan ................. G06F 3/0428 345/175 |
| 2020/0333947 | A1* | 10/2020 | Tanabe .................. G06F 3/0488 |
| 2020/0361192 | A1* | 11/2020 | Choi .................. C09D 133/066 |
| 2023/0137004 | A1* | 5/2023 | Huizen .................. H04N 25/10 348/77 |

OTHER PUBLICATIONS

U.S. Appl. No. 61/707,625, filed Sep. 28, 2012, entitled Integrated Spotter in Interior Electrochromic Mirror.

* cited by examiner

B-B

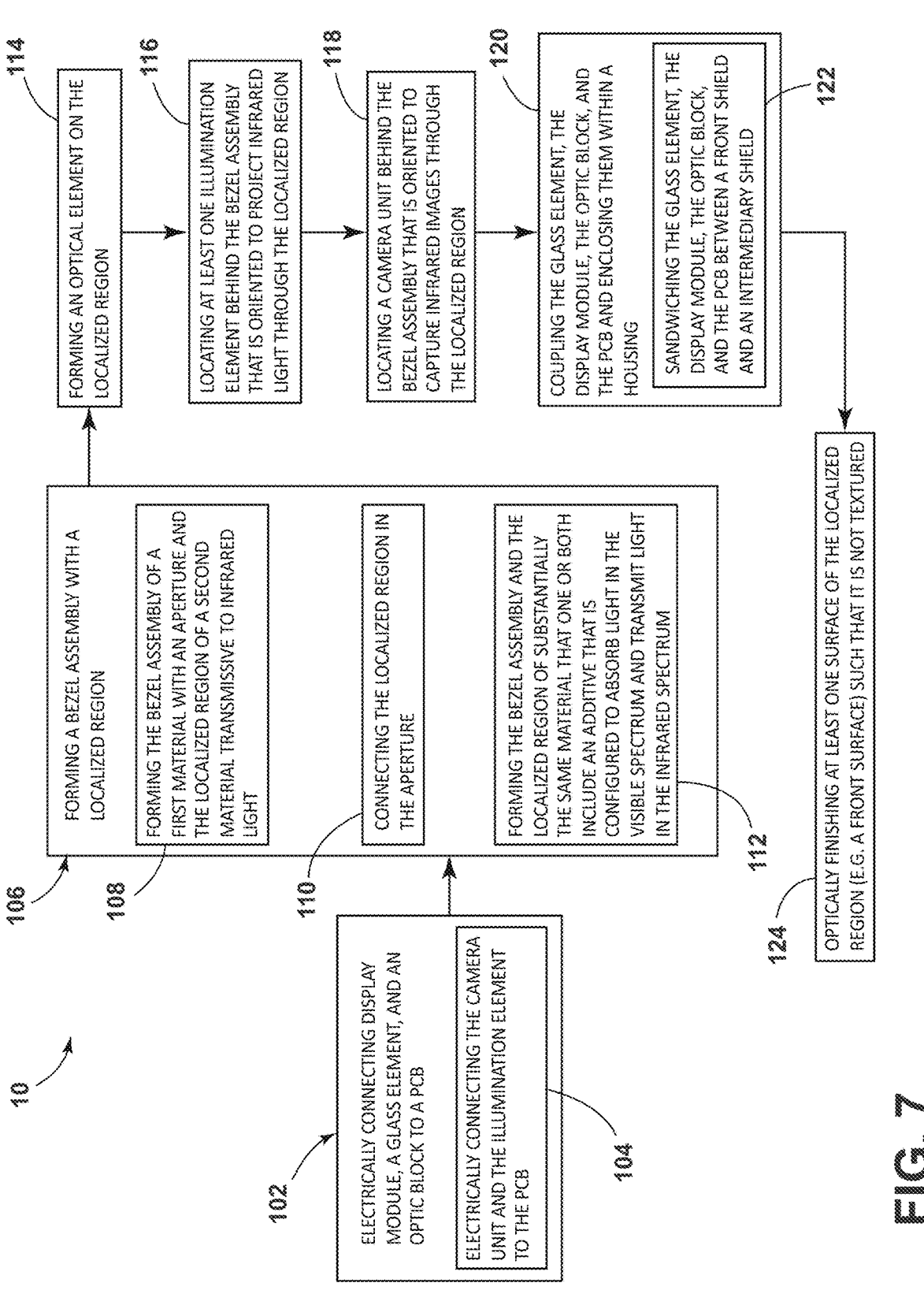

ELECTRICALLY CONNECTING DISPLAY MODULE, A GLASS ELEMENT, AND AN OPTIC BLOCK TO A PCB

102

ELECTRICALLY CONNECTING THE CAMERA UNIT AND THE ILLUMINATION ELEMENT TO THE PCB

104

FORMING A BEZEL ASSEMBLY WITH A LOCALIZED REGION

106

FORMING THE BEZEL ASSEMBLY OF A FIRST MATERIAL WITH AN APERTURE AND THE LOCALIZED REGION OF A SECOND MATERIAL TRANSMISSIVE TO INFRARED LIGHT

108

CONNECTING THE LOCALIZED REGION IN THE APERTURE

110

FORMING THE BEZEL ASSEMBLY AND THE LOCALIZED REGION OF SUBSTANTIALLY THE SAME MATERIAL THAT ONE OR BOTH INCLUDE AN ADDITIVE THAT IS CONFIGURED TO ABSORB LIGHT IN THE VISIBLE SPECTRUM AND TRANSMIT LIGHT IN THE INFRARED SPECTRUM

112

FORMING AN OPTICAL ELEMENT ON THE LOCALIZED REGION

114

LOCATING AT LEAST ONE ILLUMINATION ELEMENT BEHIND THE BEZEL ASSEMBLY THAT IS ORIENTED TO PROJECT INFRARED LIGHT THROUGH THE LOCALIZED REGION

116

LOCATING A CAMERA UNIT BEHIND THE BEZEL ASSEMBLY THAT IS ORIENTED TO CAPTURE INFRARED IMAGES THROUGH THE LOCALIZED REGION

118

COUPLING THE GLASS ELEMENT, THE DISPLAY MODULE, THE OPTIC BLOCK, AND THE PCB AND ENCLOSING THEM WITHIN A HOUSING

120

SANDWICHING THE GLASS ELEMENT, THE DISPLAY MODULE, THE OPTIC BLOCK, AND THE PCB BETWEEN A FRONT SHIELD AND AN INTERMEDIARY SHIELD

122

OPTICALLY FINISHING AT LEAST ONE SURFACE OF THE LOCALIZED REGION (E.G. A FRONT SURFACE) SUCH THAT IT IS NOT TEXTURED

FULL DISPLAY MIRROR ASSEMBLY WITH THROUGH BEZEL INFRARED ILLUMINATION

CROSS-REFERENCE TO RELATED APPLICATION

This application claims priority to and the benefit under 35 U.S.C. § 119(e) of U.S. Provisional Application No. 63/322,394, filed on Mar. 22, 2022, entitled "FULL DIS- PLAY MIRROR ASSEMBLY WITH THROUGH BEZEL INFRARED ILLUMINATION," the disclosure of which is hereby incorporated herein by reference in its entirety.

BACKGROUND OF THE DISCLOSURE

The present disclosure generally relates to a rearview mirror, and, more particularly, a mirror assembly having a bezel that is at least partially transmissive to infrared light.

SUMMARY OF THE DISCLOSURE

According to one aspect of the present disclosure, a mirror assembly for a vehicle includes a housing and a bezel assembly that includes at least one localized region that is substantially opaque to a visible spectrum of light and substantially transmissive to an infrared spectrum of light. The mirror assembly further includes a plurality of button regions, each button region having an illumination element and at least one sensor. The illumination element is located in the housing and oriented to project infrared illumination through the at least one localized region. The at least one sensor is located proximate each illumination element and each sensor is configured to detect increases in the presence of the infrared spectrum of light. A control system is configured to obtain the detected increases in the presence of the infrared spectrum of light from the at least one sensor and generate a user input associated with the button region with the at least one sensor.

According to another aspect of the present disclosure, a mirror assembly for a vehicle includes a housing and a bezel assembly that includes at least one localized region that is substantially opaque to a visible spectrum of light and substantially transmissive to an infrared spectrum of light. The mirror assembly further includes an illumination element located in the housing and oriented to project infrared illumination through the at least one localized region. A button region is located proximate to the illumination element, the button region includes at least one sensor configured to detect increases in the presence of the infrared spectrum of light. A control system is configured to obtain the detected increases in the presence of the infrared spectrum of light from the at least one sensor and generate a user input associated with the button region with the at least one sensor.

According to yet another aspect of the present disclosure, a mirror assembly for a vehicle includes a housing and a bezel assembly that includes at least one localized region that is substantially opaque to a visible spectrum of light and substantially transmissive to an infrared spectrum of light. The mirror assembly further includes at least one sensor configured to detect increases in the presence of the infrared spectrum of light. A button region is located proximate the at least one sensor, the button region includes an illumination element located in the housing and oriented to project infrared illumination through the at least one localized region. A control system is configured to obtain the detected increases in the presence of the infrared spectrum of light from the at least one sensor and generate a user input associated with the button region with the at least one sensor.

These and other features, advantages, and objects of the present disclosure will be further understood and appreciated by those skilled in the art by reference to the following specification, claims, and appended drawings.

BRIEF DESCRIPTION OF THE DRAWINGS

FIG. 7 is a method of assembling the mirror assembly, according to the present disclosure.

DETAILED DESCRIPTION

Figure 1:
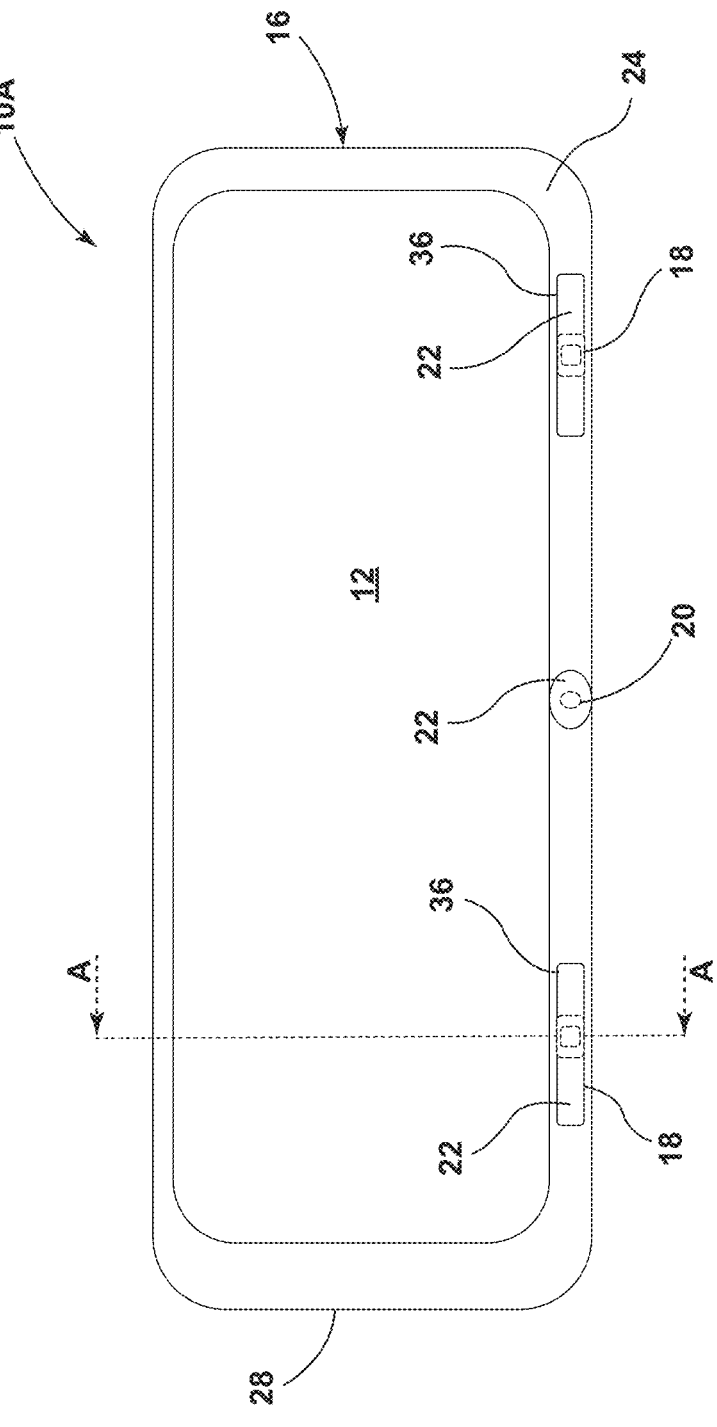
FIG. 1 is a front view of a mirror assembly of a first construction for a vehicle with a bezel assembly that includes localized regions formed of a material that is transmissive to light in the infrared spectrum, according to the present disclosure.

The present illustrated embodiments reside primarily in combinations of method steps and apparatus components related to a display mirror. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer of the display mirror, and the term "rear" shall refer to the surface of the element further from the intended viewer of the display mirror. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring initially to FIGS. 1-4, reference numeral 10A generally designates a mirror assembly for a vehicle under a first construction that may be configured as a full display mirror and include a reflective state and a display state. In the reflective state, the mirror assembly 10A operates as a mirror, reflecting light at various wavelengths back towards an intended viewer. In the display state, the mirror assembly 10A relays image data information (e.g., an image, a message, or a recommendation) based on one or more images captured from one or more image capturing components. The mirror assembly 10A includes a partially reflective, partially transmissive element 12, such as an electro-optic device (also referred to as a "glass element" herein) and a display module 14 (FIG. 6) that is viewed through the glass element 12. The mirror assembly 10A further includes a housing 15 that includes a bezel assembly 16 that shields and supports the glass element 12 and the display module 14. In some embodiments, the mirror assembly 10A may be configured as a traditional mirror (e.g., without one or both of the partially reflective, partially transmissive element 12 and the display module 14) with the bezel assembly 16 described herein.

The mirror assembly 10A further includes at least one illumination element 18. In some embodiments, the illumination elements 18 may include one or more infrared emitters for transmitting infrared wavelengths of light (e.g., in a structured light pattern and/or a flood pattern). The at least one illumination element 18 may be located in the housing 15 and oriented towards the bezel assembly 16. The mirror assembly 10A may further include a camera unit 20 for capturing image data (e.g., one or more images or videos) from a cabin of an associated vehicle. The camera unit 20 and the at least one illumination element 18 may utilize the same control system (e.g., PCB, ECU, and/or processors) as the other components of the mirror assembly 10A. The camera unit 20 may include one or more cameras that include a variety of image-capturing technology, such as night mode, image enhancement, thermal recognition, recording capabilities, wide angle lenses, and other features. In some embodiments, the camera unit 20 may also be located in the housing 15 and oriented towards the bezel assembly 16.

Figure 2:
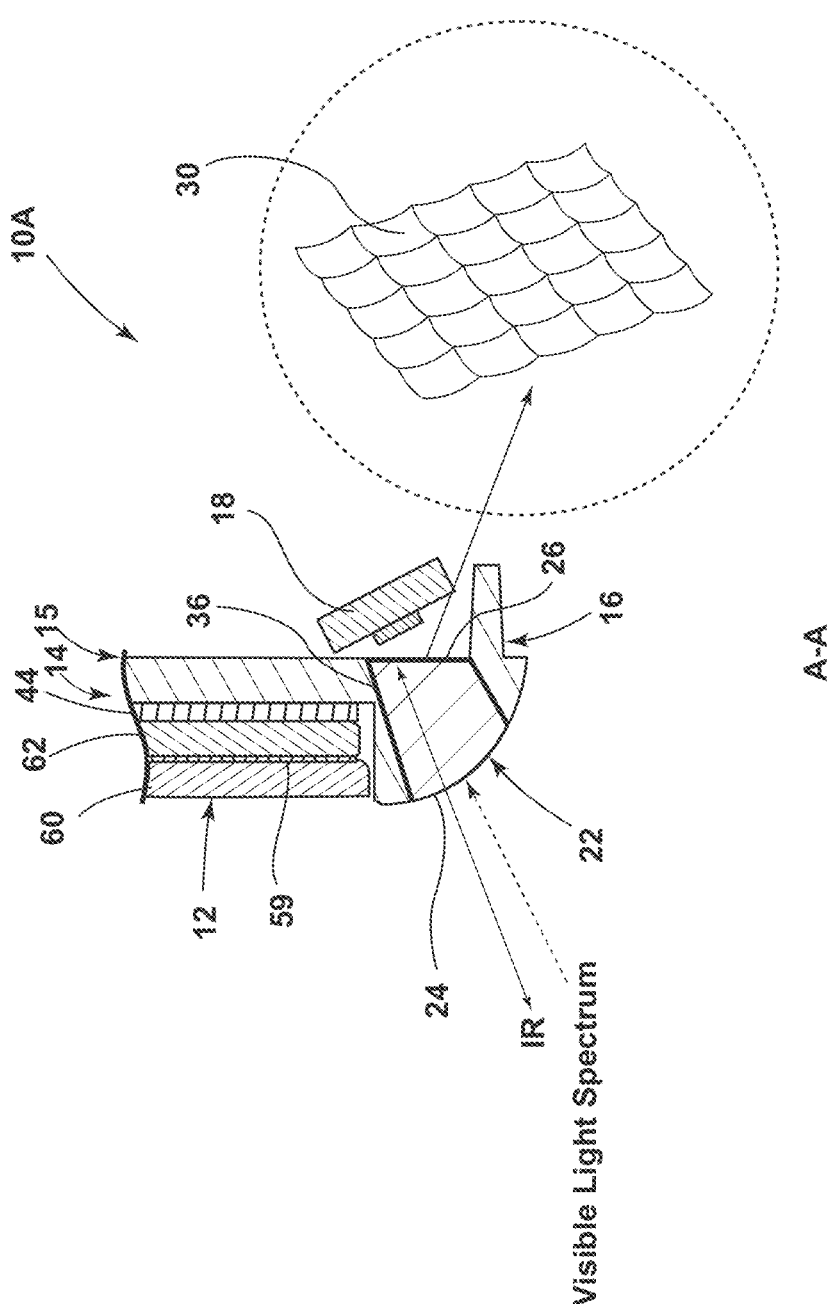
FIG. 2 is a side cross-sectional view of the mirror assembly from FIG. 1, according to certain aspects of the present disclosure.

With reference now to FIGS. 1 and 2, the bezel assembly 16 may be formed of a first material, for example, a glass-filled nylon, materials that are not transmissive to wavelengths in the infrared spectrum, and/or other materials. The bezel assembly 16 may further include one or more localized regions 22 that are formed of a second material, for example, a material that is transmissive to wavelengths in the infrared spectrum. For example, the one or more localized regions 22 may be formed of a resin material, such as polycarbonate, polymethyl methacrylate (PMMA), and or the like. In some embodiments, the material forming the one or more localized regions 22 may be transparent or translucent to a large spectrum of wavelengths, including those in the visible spectrum and the infrared spectrum. An additive, such as a dye, may be mixed into the second material (e.g., in a flow state) that is substantially absorptive to the visible spectrum and substantially transmissive to the infrared spectrum. In some embodiments, the additive may be substantially absorptive (e.g., less than 5% transmission, less than 10% transmission, or less than 15% transmission) to wavelengths less than about 650 nm. In some embodiments, the additive may be substantially transmissive (e.g., more than 50% transmission, more than 60% transmission, more than 70% transmission, more than 80% transmission, or more than or about 85% transmission) to wavelengths above about 680 nm, for example, about 680 nm or more, about 700 nm or more, or about 720 nm or more. As such, the one or more localized regions 22 may be opaque to a viewer, but able to substantially transmit wavelengths in the infrared spectrum. In some embodiments, the dye one in the one more localized regions 22 may be color matched with surrounding areas of the localized regions 22 (e.g., the first material). The one or more localized regions 22 may each be located adjacent to the at least one illumination element 18 to permit light in the infrared spectrum to transmit out of the bezel assembly 16 and towards the cabin. In some embodiments, there may be one localized region 22 for each illumination element 18. In other embodiments, there may be one localized region 22 for more than one illumination element 18. In some embodiments, the camera unit 20 may be located proximate (e.g., behind) the one or more localized regions 22 to permit capturing of images in the infrared spectrum through the bezel assembly 16. In some embodiments, the camera unit 20 is located within the bezel assembly 16, but includes a cover glass, visibly transparent lens formed of plastic, or an exposure aperture, rather than being located behind the one of the localized regions 22. In some embodiments, the camera unit 20 is embedded within or otherwise connected to an outside portion of the bezel assembly 16.

With reference now specifically to FIG. 2, the at least one localized region 22 may include a front surface 24, a rear surface 26, and a side surface 28 (e.g., the outer perimeter). The one of the localized regions 22 may be located proximate the front surface 24, the rear surface 26, and/or the side surface 28. In some embodiments, the front surface 24 and the rear surface 26 of the localized regions 22 are substantially parallel (e.g., within 10° or less, for example, within 5° or less, or parallel). At least one optical element 30 may be located proximate (e.g., aligned with) each of the localized regions 22. For example, the optical element 30 may be located on the rear surface 26. In some embodiments, the optical element 30 may be integral with the at least one localized region 22 (e.g., molded or otherwise formed integrally). In other embodiments, the optical element 30 may be coupled (e.g., connected) to the at least one localized region 22. The optical element 30 may be configured to redirect (e.g., refract) the projected infrared illumination from the illumination element 18 in a controlled or semi-controlled pattern to direct the light into various areas of the cabin. In some embodiments, the optical element 30 may be further configured to focus (e.g., collimate) light from the associated illumination element 18 in a controlled or semi-controlled pattern to focus beams of the light into various areas of the cabin. In some examples, the optical element 30 includes, for example, an optical pillow (FIG. 2), a prism, a textured surface, a smooth surface, and/or the like. As illustrated, the optical pillow may define a series of convex or concave structures 32. The at least one localized region 22 and the associated illumination elements 18 may be located to project light through the front surface 24 and/or side surface 28 of the bezel assembly 16. As depicted, the localize regions 22 may be located along a bottom portion of the front surface 24 and/or side surface 28. Thus, in some embodiments, the optical elements 30 may reorient projection of the light towards areas in the cabin in addition to controlled or semi-controlled redirecting (e.g., refraction and/or collimation). In some embodiments, the optical elements 30 may further include features, such as lenses, used in conjunction with the camera unit 20. As will be described in detail below, the at least one localized region 22 may be molded (e.g., second shot in a molding process where other portions of the bezel assembly 16 are the first shot) or otherwise fit and coupled (e.g., with adhesives, screws, heatstakes, snaps, and/or other mechanical attachment methods) into apertures 36 defined by the front surface 24, the rear surface 26, and/or the side surface 28. In some embodiments, portions of the front surface 24 and/or side surface 28 defined by the localized region 22 may be optically polished. It should be appreciated that the bezel assembly 16 and localized regions 22 (e.g., via the additive) may be substantially the same color such that they are indistinguishable by a viewer. For example, the bezel assembly 16 and localized regions 22 may be black, red, brown, other colors, and/or combinations thereof. The front surface 24 of the localized regions 22 may be smooth in texture (e.g., polished) to prevent optical scattering.

Figure 3:
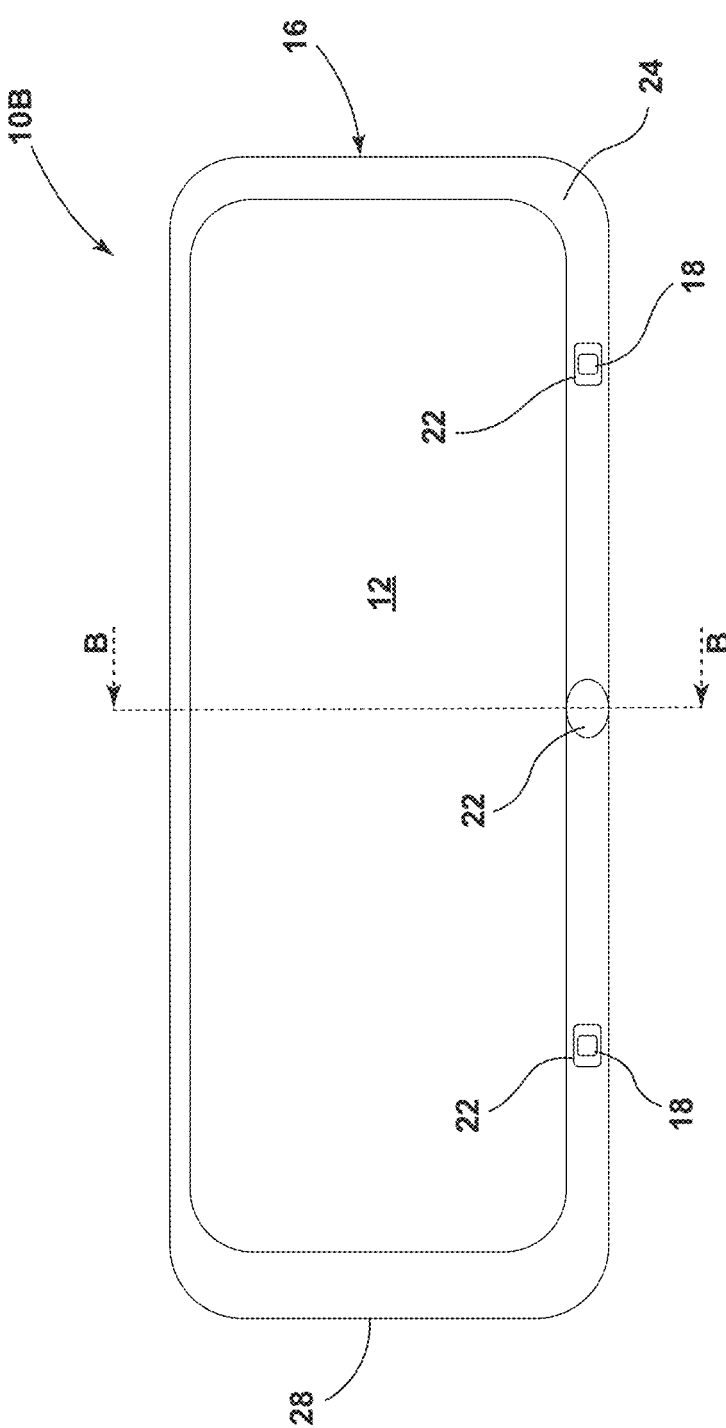
FIG. 3 is a front view of a mirror assembly of a second construction for a vehicle with a bezel assembly that is substantially formed of a material that is transmissive to light in the infrared spectrum, according to another aspect of the present disclosure.
Figure 4:
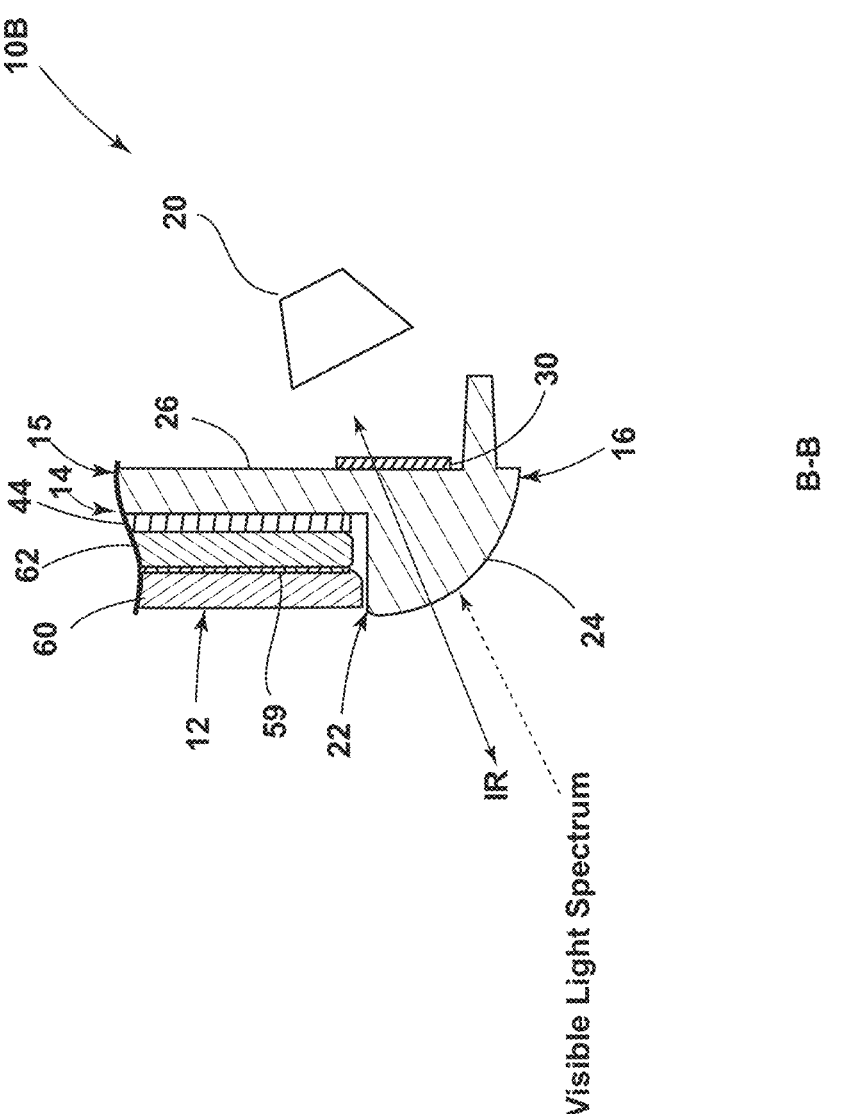
FIG. 4 is a side cross-sectional view of the mirror assembly from FIG. 3, according to certain aspects of the present disclosure.

With reference now to FIGS. 3-4, a mirror assembly 10B includes a second construction. Under the second construction, the mirror assembly 10B may be configured as a full display mirror or a traditional mirror with the bezel assembly 16 described herein. The second construction may include all the same features, elements, functions, materials, and may be incorporated into the same structures as the other constructions. However, the bezel assembly 16 and the one or more localized regions 22 are formed of a substantially coextensive and integral material, for example, a material that is substantially transmissive to wavelengths in the infrared spectrum, but substantially absorptive in wavelengths in the visible spectrum. For example, the bezel assembly 16 and the one or more localized regions 22 may be formed of a resin material, such as polycarbonate, polymethyl methacrylate (PMMA), and/or the like, with an additive, such as a dye as described above. As illustrated in FIG. 4, the rear surface 26 of the bezel assembly 16 may be proximate the one or more optical elements 30 as described above (e.g., integrally formed or otherwise connected).

Figure 5A:
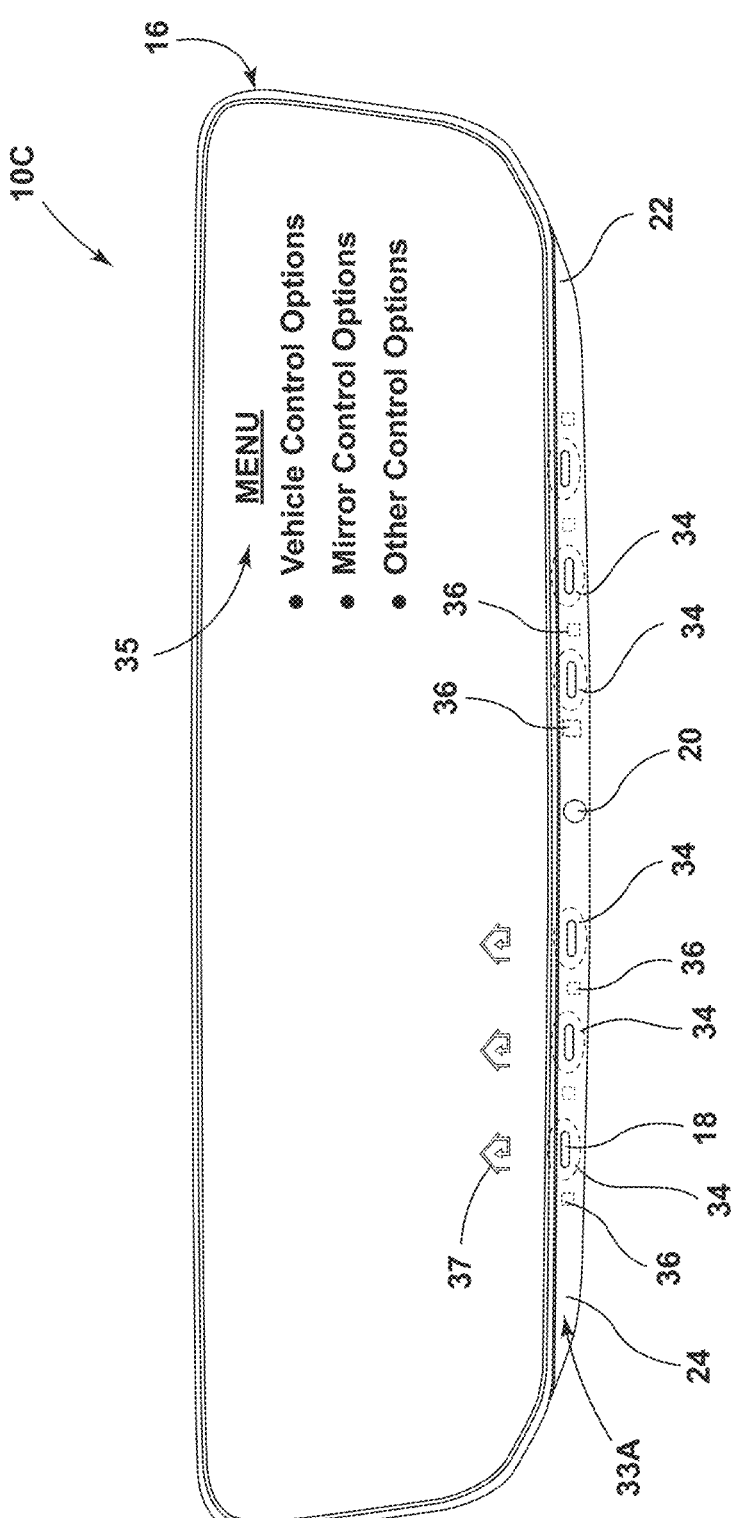
FIG. 5A is a front view of a mirror assembly of a third construction for a vehicle with a bezel assembly that includes a user input module of a first arrangement, according to another aspect of the present disclosure.

With reference now to FIG. 5A, a mirror assembly 10C includes a third construction. Under the third construction, the mirror assembly 10C may be configured as a full display mirror or a traditional mirror with the bezel assembly 16 described herein. The third construction may include all the same features, elements, functions, materials, and may be incorporated into the same structures as the other constructions. However, the mirror assembly 10C is configured to utilize the at least one localized region 22 and illumination elements 18 as a user input module 33A of a first arrangement. More particularly, the mirror assembly 10C includes one or more button regions 34 that define a portion of the bezel assembly 16. Each button region 34 includes at least one of the illumination elements 18 and/or a sensor 36 (e.g., an infrared sensor) configured to detect the presence of the infrared spectrum of light. The sensors 36 may be located within the at least one localized region 22, on the front surface 24, on the rear surface 26, on the side surface 28, or within areas of the bezel assembly 16 surrounding the at least one localized region 22. The button regions 34 may be aligned with or proximate to the localized region 22 and defined by the front surface 24. In use, the sensors 36 detect the presence of infrared light reflecting from a user's finger. The closer the user's finger gets to one of the illumination elements 18, the greater the detected presence of the infrared spectrum of light by the sensors 36. The full display mirror 10C includes a control system (e.g., a primary printed circuit board 50, which may include at least one processor) configured to identify increases in the presence of the infrared spectrum of light within one of the button regions 34 and generate a user input associated with the button region 34. In embodiments where the mirror assembly 10C is configured as a full display mirror, a user input from one of the button regions 34 may generate a signal to cause the control system to generate visual information on the display module 14. The visual information may include a menu 35 with a list of user options. For example, the menu 35 may include user options, such as functions associated with the mirror assembly 10C (e.g., what type of visual information is displayed, dimming functions, etc.), functions associated with a vehicle (e.g., audio, heating, overhead lights etc.), and/or other functions (e.g., garage door opening, device pairing, etc.). However, it should be appreciated that in embodiments where the mirror assembly 10C is configured as a traditional mirror, the user inputs may provide the same functions without the menu 35 and/or a different menu may be generated in a location other than the mirror assembly 10C (e.g., a mobile device, an infotainment center, a display, GPS, and/or the like). Each button region 34 may be associated with a different user input and function. In some embodiments, each button region 34 includes an indicia 37, such as a raised or textured surface, a color, a digital visualization from the display module 14, or a non-digital marking on the glass element 12 to visually notify a user of the locations of the button regions 34.

With continued reference to FIG. 5A, the user input module 33A of a first arrangement includes button regions 34 located over the illumination elements 18 and the infrared sensor 36 may be located on one or both sides (e.g., opposite first and second sides) of each button region 34 to determine which of the specific button regions 34 is being pressed (or intended on being pressed). This determination may be based on the detected reflection (e.g., which infrared sensor(s) 36 detects the most amount of infrared light). In some embodiments, the control system may be configured to determine an intention to press a specific button region 34 (e.g., generate a user input) by a predetermined value of detected infrared light, a predetermined rate of change of detected infrared light, other profiles (e.g., double tap, pressing a button region 34 for a length of time), and/or the like. The control system may further be configured to identify that one of the specific button regions 34 has been pressed and perform certain functionalities as described above associated with that specific button region 34. In some embodiments, the button regions 34 may include touch activation components and also rely on detection from the infrared sensors 36 as a secondary source of user inputs. In some embodiments, the localized region 22 may be singular and cover each of the infrared sensors 36 and illumination elements 18. In some embodiments, the localized region 22 may include a plurality of localized regions 22 and each localized region may cover specific groupings of the infrared sensors 36 and illumination elements 18. For example, the localized region may include a pair of localized regions 22 each located on an opposite side of the camera unit 20 and covering multiple illumination elements 18 and infrared sensors 36. In some embodiments, the plurality of localized regions 22 may be configured so that one localized region 22 covers only one illumination element 18 and one or more infrared sensors 36.

Figures 5B, 5C:
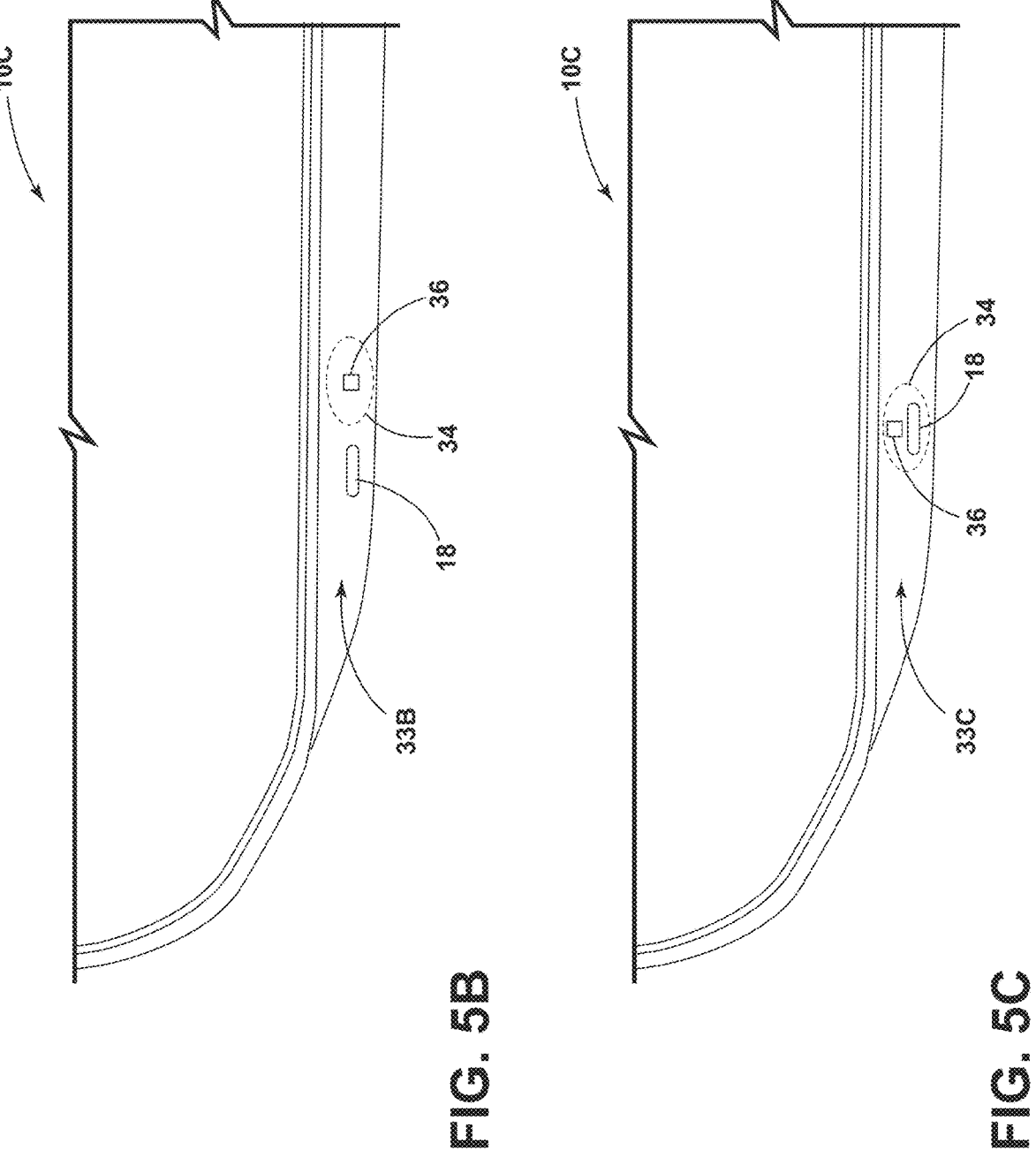
FIG. 5B is an enlarged front view of a mirror assembly of a third construction for a vehicle with a bezel assembly that includes a user input module of a second arrangement, according to another aspect of the present disclosure.
FIG. 5C is an enlarged front view of a mirror assembly of a third construction for a vehicle with a bezel assembly that includes a user input module of a third arrangement, according to another aspect of the present disclosure.

With reference now to FIG. 5B, the mirror assembly 10C includes a user input module 33B of a second arrangement. Under the second arrangement, functionalities, and principal operation of the button regions 34 is the same as the other arrangements described herein. However, the button regions 34 are each located directly over one of the infrared sensors 36 and the illumination element 18 is located proximate the button region 34. In some embodiments, the button regions 34 in the user input module 33B may be located in the bezel assembly 16 and spaced or adjacent to the localized region 22, rather than over the localized region 22. In this manner, the camera unit 20 can capture the infrared illumination without significant disturbance from user interaction.

With reference now to FIG. 5C, the mirror assembly 10C includes a user input module 33C of a third arrangement. Under the third arrangement, functionalities, and principal operation of the button regions 34 is the same as the other arrangements described herein. However, the button regions 34 are each located directly over one of the infrared sensors 36 and one of the illumination elements 18. In some embodiments, each button region 34 includes one of the infrared sensors 36 and one of the illumination elements 18 that are connected to a common bench structure. In this manner, the infrared sensor 36 and illumination element 18 can be simultaneously installed in the button region 34. The button regions 34 in the user input module 33C may be aligned with one or more of the localized regions 34.

Figure 6:
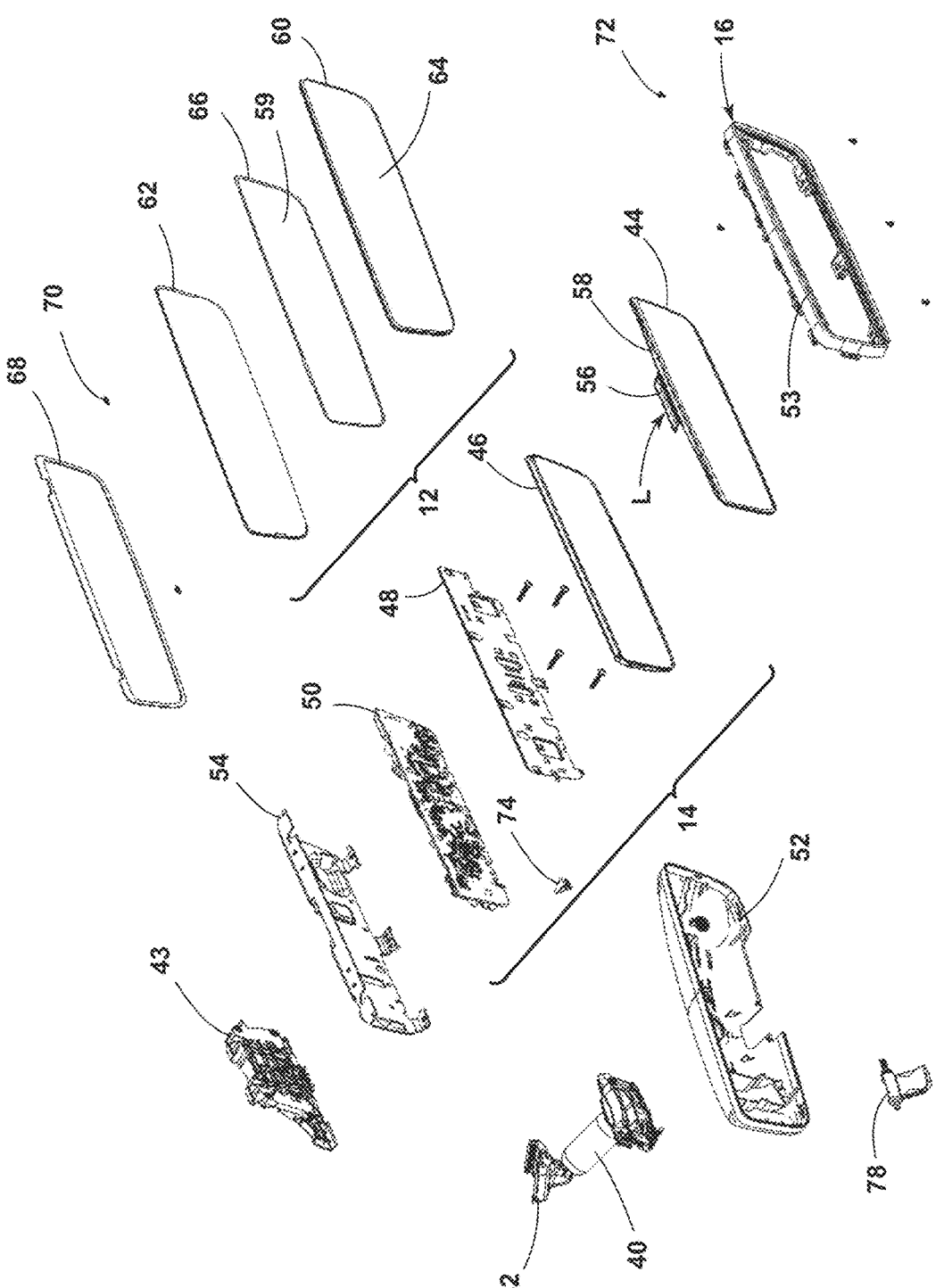
FIG. 6 is a disassembled top perspective view of the mirror assembly, according to certain aspects of the present disclosure.

Referring now to FIG. 6, in some embodiments, the mirror assembly 10A-10C may include some or all of the components that are illustrated in a partially unassembled state. For example, the mirror assembly 10A-10C may include a mounting member 40 that extends rearward from the housing 15. The mounting member 40 includes a mount plate 42 and a mounting bracket 43 that is adapted for mounting on a windshield or overhead space of a vehicle. The bezel assembly 16 may be configured to be part of the outer profile of the glass element 12.

The display module 14 include several components, for example, a display 44, an optic block 46, a heat sink 54, and the PCB 50. The PCB 50 operates to provide electrical power and control for the components of the camera unit 20, the illumination elements 18, the display module 14, and the glass element 12. The mirror assembly 10A-10C may include a rear housing 52, a front shield 53, and an intermediate shield 48 which shield and support the glass element 12 and the display module 14. The rear housing 52, the intermediate shield 48, the front shield 53, and components of the display module 14 include various retaining features to operably connect the several components of the display module 14 with the rear housing 52, the intermediate shield 48, the front shield 53, the bezel assembly 16, and each other, and to provide support to the display module 14. Specifically, the rear housing 52 includes retaining features to operably connect the rear housing 52 to the intermediate shield 48, which includes retaining features to operably connect the display module 14. The bezel assembly 16 and the front shield 53, likewise, have retaining features to operably connect the bezel assembly 16 and the front shield 53 to the display module 14. The retaining features generally include snap-fit connections, tab and slot connections, screw connections, and/or other known retaining features. In some embodiments, the intermediate shield 48 or other portions of the mirror assembly 10A-10C may include an ambient light sensor (not shown).

The display 44 may generate visual information such as graphics, images, or videos through the glass element 12. In some embodiments, the visual information may be related to the image data captured by the camera unit (e.g., such as a warning, recommendation, or image). In some embodiments, the visual information may be related to the user interface menu 35. The display 44 may be a liquid crystal display (LCD), a light-emitting diode (LED), an organic light-emitting diode (OLED), plasma, digital light processing (DLP), or other display technology. The display 44 further includes a flexible electrical connector 56 which is operably mechanically and electrically connected with the PCB 50. The flexible electrical connector 56 has a length L that is sufficient to extend over and wrap around the display module components between the display 44 and the PCB 50, and has a width which extends substantially along a top edge 58 of the display 44. Ends of the flexible electrical connector 56 may be chamfered to ease manufacturing. The flexible electrical connector 56, when operably coupled to the PCB 50, aids in securing the components along a top edge 58 of the display module 14.

The glass element 12 may include an electro-optic medium 59 which may include a prism-type construction or an electrochromic-type construction. In the prism-type construction, the electro-optic medium 59 may generally include one glass element 12 having a varying thickness from top to bottom. The glass element 12 includes at least two glass substrates, which may include a front substrate 60 as well as a rear substrate 62. The front substrate 60 may include a first surface and a second surface and the rear substrate 62 may include a third surface and a fourth surface. An electro-optic medium 59 may be disposed between the front substrate 60 and the rear substrate 62. The mirror assembly 10A-10C has a viewing area 64 disposed on a front surface of the front substrate 60. The viewing area 64 may be a rectangular shape, a trapezoidal shape, or any custom contoured shape for utilitarian and aesthetic purposes. A border of the glass element 12 may incorporate a concealing layer 66 or edge treatment, such as a chrome ring, an opaque ring, or other similar finish, to conceal a peripheral area of the rear housing 52, the intermediate shield 48, and other elements located behind the glass element 12. A foam adhesive 68 may be connected to an inner side of the glass element 12. A pair of J-clips 70 (or other types of conductors) may electrically couple the glass element 12 to the PCB 50. In the electrochromic-type construction, the electro-optic medium 59 is an electrochromic medium, which includes at least one solvent, at least one anodic material, and at least one cathodic material. Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity changes from a first phase to a second phase. During assembly, mechanical fasteners 72 may connect the components of the mirror assembly 10A-10C.

The electrochromic component as disclosed herein may be a single-layer, single-phase component, multi-layer component, or multi-phase component, as described in U.S. Pat. No. 5,928,572 entitled "Electrochromic Layer and Devices Comprising Same," U.S. Pat. No. 5,998,617 entitled "Electrochromic Compounds," U.S. Pat. No. 6,020,987 entitled "Electrochromic Medium Capable of Producing a Pre-selected Color," U.S. Pat. No. 6,037,471 entitled "Electrochromic Compounds," U.S. Pat. No. 6,141,137 entitled "Electrochromic Media for Producing a Pre-selected Color," U.S. Pat. No. 6,241,916 entitled "Electrochromic System," U.S. Pat. No. 6,193,912 entitled "Near Infrared-Absorbing Electrochromic Compounds and Devices Comprising Same," U.S. Pat. No. 6,249,369 entitled "Coupled Electrochromic Compounds With Photostable Dication Oxidation States," U.S. Pat. No. 6,137,620 entitled "Electrochromic Media With Concentration Enhanced Stability, Process For The Preparation Thereof and Use In Electrochromic Devices," and U.S. Pat. No. 6,519,072 entitled "Electrochromic Device"; and International Patent Publication Nos. 98/42796 entitled "Electrochromic Polymeric Solid Films, Manufacturing Electrochromic Devices Using Such Solid Films, and Processes for Making Such Solid Films And Devices," and 99/02621 entitled "Electrochrome Polymer Systems," which are herein incorporated by reference in their entireties. The glass element 12 may also be any other element having partially reflective, partially transmissive properties. To provide electric current to the glass element 12, electrical elements (e.g., a bus tape) may be provided on opposing sides of the element, to generate an electrical potential therebetween. The present disclosure may be used with a display mirror system, such as that described in U.S. Pat. Nos. 9,505,349 and 10,739,591, which are hereby incorporated herein by reference in their entireties.

With continued reference to FIG. 6, a glare sensor optic 74 may be provided to the bottom side of the rear housing 52, in a location which receives light below the glass element 12 and below the display 44. The glare sensor optic 74 receives light from headlamps of a trailing vehicle, and measures information regarding the likely glare visible on the glass element 12 and communicates this information to the mirror assembly 10A-10C so that the mirror assembly 10A-10C can be optimized to allow viewing of the display 44 through the glass element 12. The glare sensor optic's 74 optical vertical/horizontal pattern may be symmetrical, so that orientation of the glare sensor optic 74 is not significant (e.g., a circular geometry). The glare sensor optic 74 could also have an asymmetrical vertical/horizontal light gathering pattern, in which case a keyed feature would be put into the lens to verify correct orientation in the mirror assembly 10A-10C. The glare sensor optic 74 could also be packaged at least partially within the bezel assembly 16 of the mirror assembly 10A-10C and have a light guide which is configured to propagate light to the glare sensor optic 74. The glare sensor optic 74 could also be an imager on a rear portion of the vehicle, where a signal representative of the received light is communicated from the glare sensor optic 74 to the mirror assembly 10A-10C. In some embodiments, the glare sensor optic 74 may include a full display mirror ("FDM") camera and image processing by components on the PCB 50.

With respect to the following description, the mirror assembly 10A-10C is considered "on axis" when a line perpendicular to the plane of the glass element 12 extends toward the eyes of a viewer. Due to the display 44 being viewed through the glass element 12, any glare on the glass element 12 may interfere with the visibility of the display 44. When the mirror assembly 10A-10C is on axis and is being used during night time driving conditions, headlights from a trailing vehicle (i.e., a vehicle driving behind the vehicle with the mirror assembly 10A-10C) are captured by the at least one image capturing device (not shown) that is located in a rearward of the vehicle for capturing images of other drivers or environmental conditions. According to one embodiment of the present disclosure, an actuator device 78, as shown in FIG. 2, is operably coupled to the mirror assembly 10A-10C. When actuated, the actuator device 78 moves at least the glass element 12 off axis (i.e., away from a direct line toward the driver's eyes). Typically, actuation of the actuator device 78 tilts the glass element 12 upwards, to move the mirror to an off-axis position. However, it should be appreciated that the actuator device 78 can be configured to move the mirror in any direction with respect to the axis. The actuator device 78 can also be configured to move the display 44 upon activation. The actuator device 78 can also be configured to turn the display 44 on or off. Thus, when the actuator device 78 is actuated to move the mirror off axis, the display 44 can be turned off. Typically, when the actuator device 78 is actuated, the mirror assembly 10A-10C rotates with the glass element 12 and the display 44, keeping a constant distance relationship to each other. When the actuator device 78 is activated, the mounting member 40 and mount plate 42 do not move with respect to the rest of the vehicle. In the illustrated embodiment, the glass element 12 and the display 44 are rigidly affixed to each other and do not move independently of one another. Alternatively, the glass element 12 could be configured to move independently of the display 44. Additionally, to provide information to the viewer of the mirror assembly 10A-10C, the mirror assembly 10A-10C may include information regarding the field of view, such as a partially transmissive graphic overlay or an image on the display 44 visible on the viewing area 64 when the mirror assembly 10A-10C is in use.

The present disclosure may be used with a mounting system, such as that described in U.S. Pat. Nos. 9,244,249; 8,960,629; 8,814,373; 8,201,800; 8,210,695; 9,174,577, 8,925,891, and 9,838,653; and U.S. Provisional Patent Application No. 61/704,869, which are hereby incorporated herein by reference in their entirety. Further, the present disclosure may be used with a rearview packaging assembly, such as that described in U.S. Pat. Nos. 9,316,347; 8,814, 373; 8,646,924; 8,643,931; 8,264,761; and 8,885,240; and U.S. Provisional Patent Application No. 61/707,625, which are hereby incorporated herein by reference in their entirety. Additionally, it is contemplated that the present disclosure can include a bezel such as that described in U.S. Pat. Nos. 8,827,517; 8,210,695; and 8,201,800, which are hereby incorporated herein by reference in their entirety.

FIG. 7 illustrates a method 100 of assembling the mirror assembly. At 102, the method 100 includes electrically connecting a glass element, a display module, and an optic block to a PCB. Step 102 may further include, at 104, electrically connecting a camera unit and the at least one illumination element to the PCB. At 106, the method 100 includes forming a bezel assembly with at least one localized region that is substantially transmissive to light in the infrared spectrum. Step 106, may include, at 108, forming the bezel assembly substantially of a first material with at least one aperture and a localized region of at least one second material. The localized region includes an additive that is configured to absorb light in the visible spectrum and transmit light in the infrared spectrum. Step 106 may further include, at 110, connecting the localized region in the aperture (e.g., second injection, adhesives, screws, heatstakes, snaps, other mechanical attachment methods, and/or the like). Step 106 may, alternatively, include, at 112, forming the bezel assembly and the localized region of substantially the same material that one or both include an additive that is configured to absorb light in the visible spectrum and transmit light in the infrared spectrum. At 114, the method 100 may include forming an optical element on a surface of the localized region (e.g., integrally or otherwise connected). It should be appreciated that step 114 may occur contemporaneously with forming the localized region in step 106. At 116, the method 100 includes locating the at least one illumination element within the bezel assembly that is oriented to project infrared light through the localized region. At 118, the method 100 may further include locating a camera unit within the bezel assembly that is oriented to capture infrared images through the localized region. At 120, the method 100 includes coupling the glass element, the display module, the optic block, and the PCB and enclosing them within a housing. Step 120 may further include, at 122, sandwiching the glass element, the display module, the optic block, and the PCB between a front shield and an intermediate shield. At 124, the method 100 may include optically finishing at least one surface of the localized region (e.g., a front surface) such that it is not textured to prevent any scattering of infrared light. In some embodiments, step 124 may occur in conjunction with step 108 when the localized region is formed.

The invention disclosed herein is further summarized in the following paragraphs and is further characterized by combinations of any and all of the various aspects described therein.

According to one aspect of the present disclosure, a mirror assembly for a vehicle includes a housing and a bezel assembly that includes at least one localized region that is substantially opaque to a visible spectrum of light and substantially transmissive to an infrared spectrum of light. The mirror assembly further includes a plurality of button regions, each button region having an illumination element and at least one sensor. The illumination element is located in the housing and oriented to project infrared illumination through the at least one localized region. The at least one sensor is located proximate each illumination element and each sensor is configured to detect increases in the presence of the infrared spectrum of light. A control system is configured to obtain the detected increases in the presence of the infrared spectrum of light from the at least one sensor and generate a user input associated with the button region with the at least one sensor.

According to another aspect, a bezel assembly is formed of a first material and an at least one localized region is formed of a second material that is different than the first material.

According to yet another aspect, the second material includes a dye that is substantially opaque to a visible spectrum of light and substantially transmissive to an infrared spectrum of light.

According to still yet another aspect, at least one sensor in each button region is located under an illumination element.

According to another aspect, the mirror assembly includes a partially reflective, partially transmissive element located in a housing and a display located behind a partially reflective, partially transmissive element.

According to yet another aspect, a control system is further configured to generate a visual information on a display as a result of a user input.

According to still yet another aspect, the visual information includes a menu with a list of user options that include functions associated with at least one of a mirror assembly and a vehicle.

According to another aspect, a user input is different for each of a button regions.

According to yet another aspect, a plurality of button regions each include an indicia to visually notify a user of a location of a button region.

According to still yet another aspect, a plurality of button regions are located along a bottom edge of a bezel assembly.

According to another aspect, at least one sensor in each button region includes two sensors.

According to yet another aspect, a plurality of button regions are each on an at least one localized region.

According to still yet another aspect, an at least one localized region includes a plurality of localized regions and at least two button regions are located on different ones of a localized region.

According to another aspect of the present disclosure, a mirror assembly for a vehicle includes a housing and a bezel assembly that includes at least one localized region that is substantially opaque to a visible spectrum of light and substantially transmissive to an infrared spectrum of light. The mirror assembly further includes an illumination element located in the housing and oriented to project infrared illumination through the at least one localized region. A button region is located proximate to the illumination element, the button region includes at least one sensor configured to detect increases in the presence of the infrared spectrum of light. A control system is configured to obtain the detected increases in the presence of the infrared spectrum of light from the at least one sensor and generate a user input associated with the button region with the at least one sensor.

According to another aspect, a bezel assembly is formed of a first material substantially opaque to a visible spectrum of light and an infrared spectrum of light.

According to yet another aspect, an at least one localized region is formed of a second material including a dye that is substantially opaque to a visible spectrum of light and substantially transmissive to an infrared spectrum of light.

According to still yet another aspect, a bezel assembly includes a raised texture proximate a button region to visually notify a user of a location of the button region.

According to another aspect, a user input effectuates functions associated with at least one of a mirror assembly and a vehicle.

According to yet another aspect of the present disclosure, a mirror assembly for a vehicle includes a housing and a bezel assembly that includes at least one localized region that is substantially opaque to a visible spectrum of light and substantially transmissive to an infrared spectrum of light. The mirror assembly further includes at least one sensor configured to detect increases in the presence of the infrared spectrum of light. A button region is located proximate the at least one sensor, the button region includes an illumination element located in the housing and oriented to project infrared illumination through the at least one localized region. A control system is configured to obtain the detected increases in the presence of the infrared spectrum of light from the at least one sensor and generate a user input associated with the button region with the at least one sensor.

According to another aspect, a bezel assembly is formed of a first material substantially opaque to a visible spectrum of light and an infrared spectrum of light and an at least one localized region is formed of a second material including a dye that is substantially opaque to the visible spectrum of light and substantially transmissive to the infrared spectrum of light.

It will be understood by one having ordinary skill in the art that construction of the described disclosure and other components (unless otherwise stated) is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A mirror assembly for a vehicle, the mirror assembly comprising:
   a housing;
   a bezel assembly formed of a first material that is substantially opaque to a visible spectrum of light and substantially transmissive to an infrared spectrum of light and including at least one localized region formed of a second material that includes, at least in part, a combination of the first material mixed with a dye that is substantially opaque to the visible spectrum of light and substantially transmissive to the infrared spectrum of light;
   a plurality of button regions, each button region comprising:
      an illumination element located in the housing and oriented to project infrared illumination through the at least one localized region; and
      at least one sensor located proximate each illumination element and each sensor is configured to detect increases in the presence of the infrared spectrum of light; and
   a control system configured to obtain the detected increases in the presence of the infrared spectrum of light from the at least one sensor and generate a user input associated with the button region with the at least one sensor.

2. The mirror assembly of claim 1, wherein the first material and the second material include a resin.

3. The mirror assembly of claim 2, wherein the second material is color matched with the first material.

4. The mirror assembly of claim 1, wherein the at least one sensor in each button region is located between the illumination element and a bottom edge of the bezel assembly.

5. The mirror assembly of claim 1, further including a partially reflective, partially transmissive element located in the housing and a display located behind the partially reflective, partially transmissive element.

6. The mirror assembly of claim 5, wherein the control system is further configured to generate a visual information on the display as a result of the user input.

7. The mirror assembly of claim 6, wherein the visual information includes a menu with a list of user options that include functions associated with at least one of the mirror assembly and the vehicle.

8. The mirror assembly of claim 1, wherein the user input is different for each of the button regions.

9. The mirror assembly of claim 1, further including a partially reflective, partially transmissive element located in the housing and a display located behind the partially reflective, partially transmissive element, and wherein each button region includes a non-digital marking on the partially reflective, partially transmissive element aligned with the button regions to visually notify a user of the locations of the button regions.

10. The mirror assembly of claim 1, wherein the button regions are located along a bottom edge of the bezel assembly.

11. The mirror assembly of claim 1, wherein the at least one sensor in each button region includes two sensors located on opposite sides of the illumination element.

12. The mirror assembly of claim 1, wherein each button region is on the at least one localized region.

13. The mirror assembly of claim 12, wherein the at least one localized region includes a plurality of localized regions and at least two of the button regions are located on different ones of the localized regions.

14. A mirror assembly for a vehicle, the mirror assembly comprising:

a housing;

a bezel assembly formed of a first material that is substantially opaque to a visible spectrum of light and substantially transmissive to an infrared spectrum of light and including at least one localized region formed of a second material that includes, at least in part, a combination of the first material mixed with a dye that is substantially opaque to the visible spectrum of light and substantially transmissive to the infrared spectrum of light, wherein a front surface of the at least one localized region is optically polished;

an illumination element located in the housing and oriented to project infrared illumination through the at least one localized region;

a button region located proximate the illumination element, the button region comprising at least one sensor configured to detect increases in the presence of the infrared spectrum of light; and a control system configured to obtain the detected increases in the presence of the infrared spectrum of light from the at least one sensor and generate a user input associated with the button region with the at least one sensor.

15. The mirror assembly of claim 14, wherein the bezel assembly includes a raised texture proximate the button region to visually notify a user of the location of the button region.

16. The mirror assembly of claim 14, wherein the user input effectuates functions associated with at least one of the mirror assembly and the vehicle.

17. A mirror assembly for a vehicle, the mirror assembly comprising:

a housing;

a bezel assembly formed of a first material that is substantially opaque to a visible spectrum of light and substantially transmissive to an infrared spectrum of light and including at least one localized region formed of a second material that includes, at least in part, a combination of the first material mixed with a dye that is substantially opaque to the visible spectrum of light and substantially transmissive to the infrared spectrum of light;

an illumination element located in the housing and oriented to project infrared illumination through the at least one localized region;

a button region located proximate the illumination element, the button region comprising two sensors located on opposite sides of the illumination element and configured to detect increases in the presence of the infrared spectrum of light; and a control system configured to obtain the detected increases in the presence of the infrared spectrum of light from the two sensor and generate a user input associated with the button region with the at least one sensor.

\* \* \* \* \*